(12) United States Patent
Hwang et al.

(10) Patent No.: US 10,215,261 B2
(45) Date of Patent: Feb. 26, 2019

(54) PLANETARY GEAR TRAIN OF AUTOMATIC TRANSMISSION FOR VEHICLE

(71) Applicant: Hyundai Motor Company, Seoul (KR)

(72) Inventors: Seong Wook Hwang, Gunpo-si (KR); Jae Chang Kook, Hwaseong-si (KR); Dong Hwan Hwang, Seoul (KR); Chang Wook Lee, Suwon-si (KR); Seongwook Ji, Ansan-si (KR); Wonmin Cho, Hwaseong-si (KR); Hyun Sik Kwon, Seoul (KR); Jong Sool Park, Hwaseong-si (KR); Kyeong Hun Lee, Seoul (KR); Jong Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 348 days.

(21) Appl. No.: 15/197,267

(22) Filed: Jun. 29, 2016

(65) Prior Publication Data

US 2017/0159766 A1 Jun. 8, 2017

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| 2008/0261763 | A1* | 10/2008 | Phillips | F16H 3/66 475/276 |
| 2011/0045936 | A1* | 2/2011 | Gumpoltsberger | F16H 3/66 475/271 |
| 2014/0128208 | A1* | 5/2014 | Noh | F16H 3/66 475/311 |
| 2014/0342870 | A1* | 11/2014 | Lippert | F16H 3/66 475/269 |
| 2014/0364269 | A1* | 12/2014 | Kaltenbach | F16H 3/006 475/282 |
| 2015/0087472 | A1 | 3/2015 | Beck et al. | |

FOREIGN PATENT DOCUMENTS

| JP | 2006-349153 A | 12/2006 |
| JP | 2013-199958 A | 10/2013 |
| WO | WO 2013/088900 A1 | 6/2013 |

* cited by examiner

*Primary Examiner* — Justin Holmes
(74) *Attorney, Agent, or Firm* — Morgan, Lewis & Bockius LLP (57) ABSTRACT

A planetary gear train of an automatic transmission for a vehicle may include an input shaft for receiving an engine torque, an output shaft for outputting a shifted torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six control elements for selectively interconnecting the rotation elements and a transmission housing.

12 Claims, 2 Drawing Sheets

| shift-stage | C1 | C2 | C3 | C4 | B1 | B2 | gear ratio | step ratio | gear ratio span |
|---|---|---|---|---|---|---|---|---|---|
| D1 |  | ● |  | ● |  | ● | 5.131 |  | 8.391 |
| D2 | ● | ● |  |  |  | ● | 3.100 | 1.655 |  |
| D3 | ● |  |  | ● |  | ● | 2.301 | 1.526 |  |
| D4 | ● |  | ● |  |  | ● | 1.556 | 1.306 |  |
| D5 | ● |  | ● | ● |  |  | 1.234 | 1.261 |  |
| D6 | ● | ● | ● |  |  |  | 1.000 | 1.234 |  |
| D7 |  | ● | ● | ● |  |  | 0.875 | 1.142 |  |
| D8 |  |  | ● | ● | ● |  | 0.735 | 1.190 |  |
| D9 |  |  |  | ● | ● |  | 0.607 | 1.213 |  |
| REV |  |  |  | ● | ● | ● | -3.859 |  |  |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0170988, filed Dec. 2, 2015, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering hard competition among auto-makers in enhancing fuel consumption of a vehicle.

In this sense, research is being conducted on engines in terms of reducing weight and improving fuel efficiency by down-sizing, and research is also being conducted to ensure both drivability and competitiveness for maximizing fuel efficiency by implementing an automatic transmission with multiple speed stages.

However, in the case of the automatic transmission, the number of internal components increases as the number of gear shift stages is increased, which may deteriorate installability, production cost, weight and/or power flow efficiency.

Therefore, in order to maximally enhance fuel consumption of an automatic transmission having increased shift stages, it is important for improved efficiency to be derived by a smaller number of parts.

In this respect, an eight-speed automatic transmission has been recently introduced, and a planetary gear train for an automatic transmission enabling more shift stages is under investigation.

Considering that gear ratio spans of recently developed eight-speed automatic transmissions are typically between 6.5 and 7.5, fuel consumption enhancement is not very large.

In the case of a gear ratio span of an eight-speed automatic transmission having a level above 9.0, it is difficult to maintain step ratios between adjacent shift stages to be linear, thereby causing driving efficiency of an engine and drivability of a vehicle to deteriorate.

Thus, research studies are underway for developing a high efficiency automatic transmission having nine or more speeds.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a planetary gear train of an automatic transmission for a vehicle having advantages of, by minimal complexity, realizing at least nine forward speeds and at least one reverse speed, increasing a gear ratio span so as to improve power delivery performance and fuel consumption, and achieving linearity of shift stage step ratios.

According to various aspects of the present invention, a planetary gear train of an automatic transmission for a vehicle may include an input shaft for receiving an engine torque, an output shaft for outputting a shifted torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six control elements for selectively interconnecting the rotation elements and a transmission housing, in which the input shaft may be continuously connected with the third rotation element and selectively connected with the seventh rotation element, the output shaft may be continuously connected with the second rotation element and the eleventh rotation element, the fourth rotation element may be continuously connected with the transmission housing, and the sixth rotation element may be continuously connected with the tenth rotation element.

The eighth rotation element may be selectively connected with the sixth rotation element, the eighth rotation element may be selectively connected with the transmission housing, the ninth rotation element may be selectively connected with the fifth rotation element, the twelfth rotation element may be selectively connected with the first rotation element, and the twelfth rotation element may be selectively connected with the transmission housing.

The first, second, and third rotation elements may be respectively a sun gear, a planet carrier, and a ring gear of the first planetary gear set, the fourth, fifth, and sixth rotation elements may be respectively a sun gear, a planet carrier, and a ring gear of the second planetary gear set, the seventh, eighth, and ninth rotation elements may be respectively a sun gear, a planet carrier, and a ring gear of the third planetary gear set, and the tenth, eleventh, and twelfth rotation elements may be respectively a sun gear, a planet carrier, and a ring gear of the fourth planetary gear set.

According to various aspects of the present invention, a planetary gear train of an automatic transmission for a vehicle may include an input shaft for receiving an engine torque, an output shaft for outputting a shifted torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, six control elements for selectively interconnecting the rotation elements and a transmission housing, a first connecting member connected to the first rotation element, a second connecting member connected to the second rotation element and the eleventh rotation element, and directly connected to the output shaft, a third connecting member connected to the third rotation element and the seventh rotation element, and directly connected to the input shaft, a fourth connecting member connected to the fourth rotation element and directly connected to the transmission housing, a fifth connecting member connected to the fifth rotation element, a sixth connecting member connected to the sixth rotation element and the tenth rotation element, a seventh connecting member connected to the eighth rotation element, selectively connected to the third connecting member and the sixth connecting member, and selectively connected to the transmission housing, an eighth connecting member connected to the ninth rotation element and selectively connected to the fifth connecting member, and a ninth connecting member connected to the twelfth rotation element, selectively connected to the first connecting member, and selectively connected to the transmission housing.

The first planetary gear set may be a single pinion planetary gear set, where the first rotation element may be a first sun gear, the second rotation element may be a first planet carrier, and the third rotation element may be a first ring gear, the second planetary gear set may be a single pinion planetary gear set, where the fourth rotation element may be a second sun gear, the fifth rotation element may be a second planet carrier, and the sixth rotation element may be a second ring gear, the third planetary gear set may be a single pinion planetary gear set, where the seventh rotation element may be a third sun gear, the eighth rotation element may be a third planet carrier, and the ninth rotation element may be a third ring gear, and the fourth planetary gear set may be a single pinion planetary gear set, where the tenth rotation element may be a fourth sun gear, the eleventh rotation element may be a fourth planet carrier, and the twelfth rotation element may be a fourth ring gear.

The six control elements may include a first clutch selectively connecting the third connecting member and the seventh connecting member, a second clutch selectively connecting the sixth connecting member and the seventh connecting member, a third clutch selectively connecting the first connecting member and the ninth connecting member, a fourth clutch selectively connecting the fifth connecting member and the eighth connecting member, a first brake selectively connecting the seventh connecting member and the transmission housing, and a second brake selectively connecting the ninth connecting member and the transmission housing.

Shift stages realized by selective operation of three control elements among the six control elements may include a forward first speed formed by simultaneous operation of the second and fourth clutches and the second brake, a forward second speed formed by simultaneous operation of the first and second clutches and the second brake, a forward third speed formed by simultaneous operation of the first and fourth clutches and the second brake, a forward fourth speed formed by simultaneous operation of the first and third clutches and the second brake, a forward fifth speed formed by simultaneous operation of the first, third, and fourth clutches, a forward sixth speed formed by simultaneous operation of the first, second, and third clutches, a forward seventh speed formed by simultaneous operation of the second, third, and fourth clutches, a forward eighth speed formed by simultaneous operation of the second and third clutches and the first brake, a forward ninth speed formed by simultaneous operation of the third and fourth clutches and the first brake, and a reverse speed formed by simultaneous operation of the fourth clutch and the first and second brakes.

According to various aspects of the present invention, a planetary gear train of an automatic transmission for a vehicle may include an input shaft for receiving an engine torque, an output shaft for outputting a shifted torque, a first planetary gear set as a single pinion planetary gear set including first, second, and third rotation elements, a second planetary gear set as a single pinion planetary gear set including fourth, fifth, and sixth rotation elements, a third planetary gear set as a single pinion planetary gear set including seventh, eighth, and ninth rotation elements, a fourth planetary gear set as a single pinion planetary gear set including tenth, eleventh, and twelfth rotation elements, a first connecting member connected to the first rotation element, a second connecting member connected to the second rotation element and the eleventh rotation element, and directly connected to the output shaft, a third connecting member connected to the third rotation element and the seventh rotation element, and directly connected to the input shaft, a fourth connecting member connected to the fourth rotation element and directly connected to the transmission housing, a fifth connecting member connected to the fifth rotation element, a sixth connecting member connected to the sixth rotation element and the tenth rotation element, a seventh connecting member connected to the eighth rotation element, selectively connected to the third connecting member and the sixth connecting member, and selectively connected to the transmission housing, an eighth connecting member connected to the ninth rotation element and selectively connected to the fifth connecting member, a ninth connecting member connected to the twelfth rotation element, selectively connected to the first connecting member, and selectively connected to the transmission housing, a first clutch selectively connecting the third connecting member and the seventh connecting member, a second clutch selectively connecting the sixth connecting member and the seventh connecting member, a third clutch selectively connecting the first connecting member and the ninth connecting member, a fourth clutch selectively connecting the fifth connecting member and the eighth connecting member, a first brake selectively connecting the seventh connecting member and the transmission housing, and a second brake selectively connecting the ninth connecting member and the transmission housing.

The first planetary gear set may include a first sun gear as the first rotation element, a first planet carrier as the second rotation element, and a first ring gear as the third rotation element, the second planetary gear set may include a second sun gear as the fourth rotation element, a second planet carrier as the fifth rotation element, and a second ring gear as the sixth rotation element, the third planetary gear set may include a third sun gear as the seventh rotation element, a third planet carrier as the eighth rotation element, and a third ring gear as the ninth rotation element, and the fourth planetary gear set may include a fourth sun gear as the tenth rotation element, a fourth planet carrier as the eleventh rotation element, and a fourth ring gear as the twelfth rotation element.

According to various aspects of the present invention, a planetary gear train of an automatic transmission for a vehicle may include an input shaft for receiving an engine torque, an output shaft for outputting a shifted torque of the engine, a first planetary gear set as a single pinion planetary gear set including a first sun gear, a first planet carrier, and a first ring gear, a second planetary gear set as a single pinion planetary gear set including a second sun gear, a second planet carrier, and a second ring gear, a third planetary gear set as a single pinion planetary gear set including a third sun gear, a third planet carrier, and a third ring gear, a fourth planetary gear set as a single pinion planetary gear set including a fourth sun gear, a fourth planet carrier, and a fourth ring gear, a first connecting member connected to the first sun gear, a second connecting member connected to the first planet carrier and the fourth planet carrier, and directly connected to the output shaft, a third connecting member connected to the first ring gear and the third sun gear, and directly connected to the input shaft, a fourth connecting member connected to the second sun gear, and directly connected to the transmission housing, a fifth connecting member connected to the second planet carrier, a sixth connecting member connected to the second ring gear and the fourth sun gear, a seventh connecting member connected to the third planet carrier, selectively connected to the third connecting member and the sixth connecting member, and selectively connected to the transmission housing, an eighth connecting member connected to the third ring gear and selectively connected to the fifth connecting member, a ninth connecting member connected to the fourth ring gear, selectively connected to the first connecting member, and selectively connected to the transmission housing, and six control elements selectively connecting the connecting members and the transmission housing.

A planetary gear train according to various embodiments of the present invention may realize at least nine forward speeds and at least one reverse speed, achieved by operating the four planetary gear sets as simple planetary gear sets by controlling six control elements.

In addition, a planetary gear train according to various embodiments of the present invention may realize a gear ratio span of more than 8.3, thereby maximizing efficiency of driving an engine.

In addition, the linearity of step ratios of shift stages is secured while multi-staging the shift stage with high efficiency, thereby making it possible to improve drivability such as acceleration before and after a shift, an engine speed rhythmic sense, and the like.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
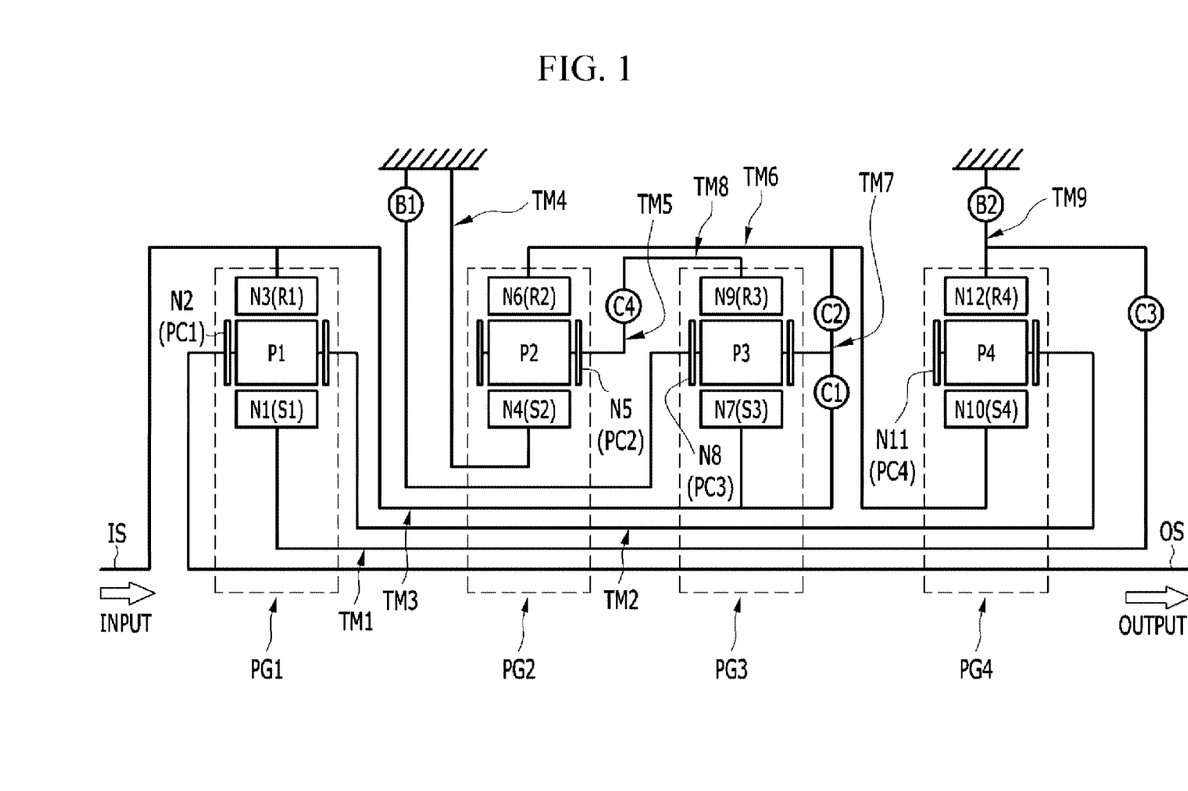
FIG. 1 is a schematic diagram of an exemplary planetary gear train according to the present invention.

FIG. 1 is a schematic diagram of a planetary gear train according to various embodiments of the present invention. Referring to FIG. 1, a planetary gear train according to various embodiments of the present invention includes first, second, third, and fourth planetary gear sets PG1, PG2, PG3, and PG4 arranged on a same axis, an input shaft IS, an output shaft OS, nine connecting members TM1 to TM9 for interconnecting rotation elements of the first, second, third, and fourth planetary gear sets PG1, PG2, PG3, and PG4, six control elements C1 to C4 and B1 to B2, and a transmission housing H.

Torque input from the input shaft IS is shifted by cooperative operation of the first, second, third, and fourth planetary gear sets PG1, PG2, PG3, and PG4, and then output through the output shaft OS.

The simple planetary gear sets are arranged in the order of first, first, second, third and fourth planetary gear sets PG1, PG2, PG3 and PG4, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotation element N10, the fourth planet carrier PC4 acts as an eleventh rotation element N11, and the fourth ring gear R4 acts as a twelfth rotation element N12.

In the arrangement of the first, second, third, and fourth planetary gear sets PG1, PG2, PG3, and PG4, the second rotation element N2 is directly connected with the eleventh rotation element N11, the third rotation element N3 is directly connected with the seventh rotation element N7, and the sixth rotation element N6 is directly connected with the tenth rotation element N10, by nine connecting members TM1 to TM9.

The nine connecting members TM1 to TM9 are arranged as follows.

The first connecting member TM1 is connected with first rotation element N1 (first sun gear S1).

The second connecting member TM2 is connected with the second rotation element N2 (first planet carrier PC1) and the eleventh rotation element N11 (fourth planet carrier PC3), and directly connected with the output shaft OS, thereby continuously acting as an output element.

The third connecting member TM3 is connected with the third rotation element N3 (first ring gear R1) and the seventh rotation element N7 (third sun gear S3), and directly connected with the input shaft IS, thereby continuously acting as an input element.

The fourth connecting member TM4 is connected with the fourth rotation element N4 (second sun gear S2), and directly connected with the transmission housing H, thereby continuously acting as a fixed element.

The fifth connecting member TM5 is connected with the fifth rotation element N5 (second planet carrier PC2).

The sixth connecting member TM6 is connected with the sixth rotation element N6 (second ring gear R2) and the tenth rotation element N10 (fourth sun gear S4).

The seventh connecting member TM7 is connected with the eighth rotation element N8 (third planet carrier PC3), selectively connected with the third connecting member TM3 and the sixth connecting member TM6, and selectively connected with the transmission housing H, thereby acting as a selective fixed element.

The eighth connecting member TM8 is connected with the ninth rotation element N9 (third ring gear R3), and selectively connected with the fifth connecting member TM5.

The ninth connecting member TM9 is connected with the twelfth rotation element N12 (fourth ring gear R4), selectively connected with the first connecting member TM1, and selectively connected with the transmission housing H, thereby acting as a selective fixed element.

The connecting members TM1 to TM9 may be selectively interconnected with one another by control elements of four clutches C1, C2, C3, and C4.

The connecting members TM1 to TM9 may be selectively connected with the transmission housing H, by control elements of two brakes B1 and B2.

The six control elements C1 to C4 and B1 to B2 are arranged as follows.

The first clutch C1 is arranged between the third connecting member TM3 and the seventh connecting member TM7, such that the third connecting member TM3 and the seventh connecting member TM7 may selectively become integral.

The second clutch C2 is arranged between the sixth connecting member TM6 and the seventh connecting member TM7, such that the sixth connecting member TM6 and the seventh connecting member TM7 may selectively become integral.

The third clutch C3 is arranged between the first connecting member TM1 and the ninth connecting member TM9, such that the first connecting member TM1 and the ninth connecting member TM9 may selectively become integral.

The fourth clutch C4 is arranged between the fifth connecting member TM5 and the eighth connecting member TM8, such that the fifth connecting member TM5 and the eighth connecting member TM8 may selectively become integral.

The first brake B1 is arranged between the seventh connecting member TM7 and the transmission housing H, such that the seventh connecting member TM7 may selectively act as a fixed element.

The second brake B2 is arranged between the ninth connecting member TM9 and the transmission housing H, such that the ninth connecting member TM9 may selectively act as a fixed element.

The control elements of the first, second, third, and fourth clutches C1, C2, C3, and C4 and the first and second brakes B1 and B2 may be realized as multi-plate hydraulic pressure friction devices that are frictionally engaged by hydraulic pressure.

Figure 2:
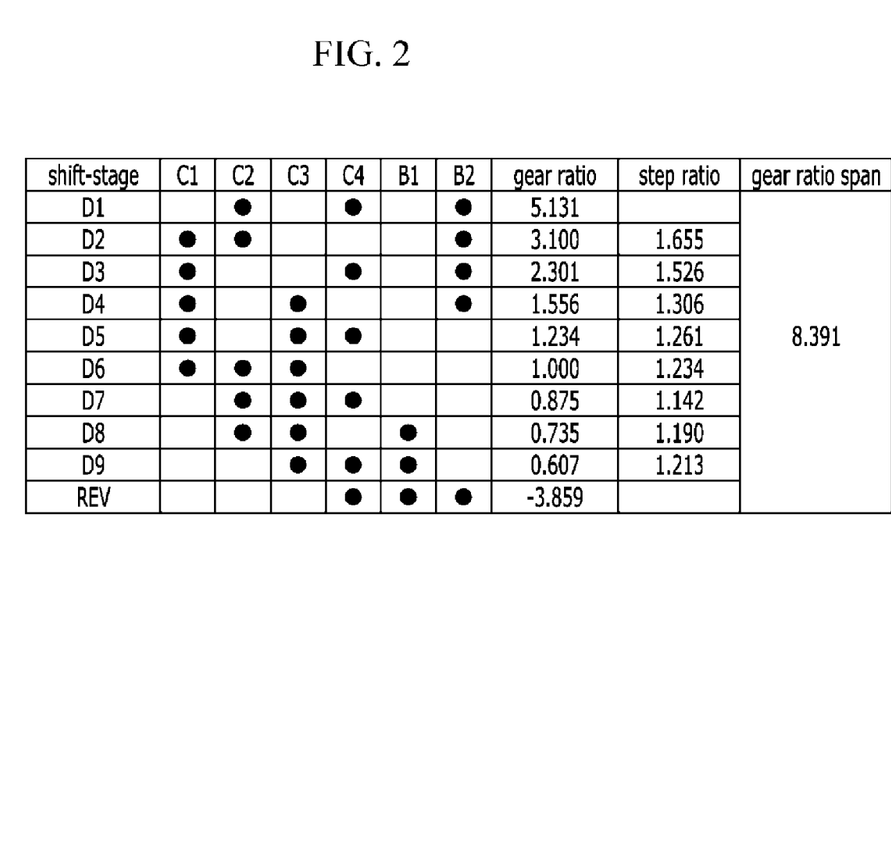
FIG. 2 is an operational chart for respective control elements at respective shift stages in the exemplary planetary gear train according to the present invention.

FIG. 2 is an operational chart for respective control elements at respective shift stages in a planetary gear train according to various embodiments of the present invention. As shown in FIG. 2, a planetary gear train according to various embodiments of the present invention performs shifting by operating three control elements at respective shift stages.

In the forward first speed shift stage D1, the second and fourth clutches C2 and C4 and the second brake B2 are simultaneously operated. As a result, the sixth connecting member TM6 is interconnected with the seventh connecting member TM7 by the operation of the second clutch C2, and the fifth connecting member TM5 is interconnected with the eighth connecting member TM8 by the operation of the fourth clutch C4. In this state, torque is input to the third connecting member TM3. In addition, the fourth connecting member TM4 continuously acts as a fixed element and the ninth connecting member TM9 simultaneously acts as a fixed element by the operation of second brake B2, thereby realizing the forward first speed by cooperative operation of respective connecting members and outputting a shifted torque through the output shaft OS connected with the second connecting member TM2.

In the forward second speed shift stage D2, the first and second clutches C1 and C2 and the second brake B2 are simultaneously operated. As a result, the third connecting member TM3 is interconnected with the seventh connecting member TM7 by the operation of the first clutch C1, and the sixth connecting member TM6 is interconnected with the seventh connecting member TM7 by the operation of the second clutch C2. In this state, torque is input to the third connecting member TM3. In addition, the fourth connecting member TM4 continuously acts as a fixed element and the ninth connecting member TM9 simultaneously acts as a fixed element by the operation of second brake B2, thereby realizing the forward second speed by cooperative operation of respective connecting members and outputting a shifted torque through the output shaft OS connected with the second connecting member TM2.

In the forward third speed shift stage D3, the first and fourth clutches C1 and C4 and the second brake B2 are simultaneously operated. As a result, the third connecting member TM3 is interconnected with the seventh connecting member TM7 by the operation of the first clutch C1, and the fifth connecting member TM5 is interconnected with the eighth connecting member TM8 by the operation of the fourth clutch C4. In this state, torque is input to the third connecting member TM3. In addition, the fourth connecting member TM4 continuously acts as a fixed element and the ninth connecting member TM9 simultaneously acts as a fixed element by the operation of second brake B2, thereby realizing the forward third speed by cooperative operation of respective connecting members and outputting a shifted torque through the output shaft OS connected with the second connecting member TM2.

In the forward fourth speed shift stage D4, the first and third clutches C1 and C3 and the second brake B2 are simultaneously operated. As a result, the third connecting member TM3 is interconnected with the seventh connecting member TM7 by the operation of the first clutch C1, and the first connecting member TM1 is interconnected with the ninth connecting member TM9 by the operation of the third clutch C3. In this state, torque is input to the third connecting member TM3. In addition, the fourth connecting member TM4 continuously acts as a fixed element and the ninth connecting member TM9 simultaneously acts as a fixed element by the operation of second brake B2, thereby realizing the forward fourth speed by cooperative operation of respective connecting members and outputting a shifted torque through the output shaft OS connected with the second connecting member TM2.

In the forward fifth speed shift stage D5, the first, third, and fourth clutches C1, C3, and C4 are simultaneously operated. As a result, the third connecting member TM3 is interconnected with the seventh connecting member TM7 by the operation of the first clutch C1, the first connecting member TM1 is interconnected with the ninth connecting member TM9 by the operation of the third clutch C3, and the fifth connecting member TM5 is interconnected with the eighth connecting member TM8 by the operation of the fourth clutch C4. In this state, torque is input to the third connecting member TM3. In addition, the fourth connecting member TM4 continuously acts as a fixed element, thereby realizing the forward fifth speed by cooperative operation of respective connecting members and outputting a shifted torque through the output shaft OS connected with the second connecting member TM2.

In the forward sixth speed shift stage D6, the first, second, and third clutches C1, C2, and C3 are simultaneously operated. As a result, the third connecting member TM3 is interconnected with the seventh connecting member TM7 by the operation of the first clutch C1, the sixth connecting member TM6 is interconnected with the seventh connecting member TM7 by the operation of the second clutch C2, and the first connecting member TM1 is interconnected with the ninth connecting member TM9 by the operation of the third clutch C3. In this state, torque is input to the third connecting member TM3. In addition, the fourth connecting member TM4 continuously acts as a fixed element, and the first, third, and fourth planetary gear sets PG1, PG3, and PG4 becomes integral, thereby realizing the forward sixth speed and outputting an input torque through the output shaft OS connected with the second connecting member TM2.

In the forward seventh speed shift stage D7, the second, third, and fourth clutches C2, C3, and C4 are simultaneously operated. As a result, the sixth connecting member TM6 is interconnected with the seventh connecting member TM7 by the operation of the second clutch C2, the first connecting member TM1 is interconnected with the ninth connecting member TM9 by the operation of the third clutch C3, and the fifth connecting member TM5 is interconnected with the eighth connecting member TM8 by the operation of the fourth clutch C4. In this state, torque is input to the third connecting member TM3. In addition, the fourth connecting member TM4 continuously acts as a fixed element, thereby realizing the forward seventh speed by cooperative operation of respective connecting members and outputting a shifted torque through the output shaft OS connected with the second connecting member TM2.

In the forward eighth speed shift stage D8, the second and third clutches C2 and C3 and the first brake B1 are simultaneously operated. As a result, the sixth connecting member TM6 is interconnected with the seventh connecting member TM7 by the operation of the second clutch C2, and the first connecting member TM1 is interconnected with the ninth connecting member TM9 by the operation of the third clutch C3. In this state, torque is input to the third connecting member TM3. In addition, the fourth connecting member TM4 continuously acts as a fixed element and the seventh connecting member TM7 simultaneously acts as a fixed element by the operation of first brake B1, thereby realizing the forward eighth speed by cooperative operation of respective connecting members and outputting a shifted torque through the output shaft OS connected with the second connecting member TM2.

In the forward ninth speed shift stage D9, the third and fourth clutches C3 and C4 and the first brake B1 are simultaneously operated. As a result, the first connecting member TM1 is interconnected with the ninth connecting member TM9 by the operation of the third clutch C3, and the fifth connecting member TM5 is interconnected with the eighth connecting member TM8 by the operation of the fourth clutch C4. In this state, torque is input to the third connecting member TM3. In addition, the fourth connecting member TM4 continuously acts as a fixed element and the seventh connecting member TM7 simultaneously acts as a fixed element by the operation of first brake B1, thereby realizing the forward eighth speed by cooperative operation of respective connecting members and outputting a shifted torque through the output shaft OS connected with the second connecting member TM2.

In the reverse speed REV, the fourth clutch C4 and the first and second brakes B1 and B2 are simultaneously operated. As a result, the fifth connecting member TM5 is interconnected with the eighth connecting member TM8 by the operation of the fourth clutch C4. In this state, torque is input to the third connecting member TM3. In addition, the fourth connecting member TM4 continuously acts as a fixed element and the seventh and ninth connecting members TM7 and TM9 simultaneously act as fixed elements by the operation of the first and second brakes B1 and B2, thereby realizing the reverse speed by cooperative operation of respective connecting members and outputting a shifted torque through the output shaft OS connected with the second connecting member TM2.

As described above, a planetary gear train according to various embodiments of the present invention may realize nine forward speeds and one reverse speed, achieved by operating the four planetary gear sets PG1, PG2, PG3, and PG4 by controlling the four clutches C1, C2, C3, and C4 and the two brakes B1 and B2.

In addition, a planetary gear train according to various embodiments of the present invention may realize a gear ratio span of more than 8.3, thereby maximizing efficiency of driving an engine.

In addition, the linearity of step ratios of shift stages is secured while multi-staging the shift stage with high efficiency, thereby making it possible to improve drivability such as acceleration before and after a shift, an engine speed rhythmic sense, and the like.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A planetary gear train of an automatic transmission for a vehicle, comprising:
    an input shaft configured for receiving an engine torque;
    an output shaft configured for outputting a shifted torque of the engine;
    a first planetary gear set including a first rotation element, a second rotation element, and a third rotation element:
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element; and
    six control elements for selectively interconnecting the rotation elements and a transmission housing,
    wherein the input shaft is continuously connected to the third rotation element and selectively connected to the seventh rotation element,
    the output shaft is continuously connected to the second rotation element and the eleventh rotation element,
    the fourth rotation element is continuously connected to the transmission housing, and
    the sixth rotation element is continuously connected to the tenth rotation element,
    wherein the eighth rotation element is selectively connected to the sixth rotation element;
    wherein the eighth rotation element is selectively connected to the transmission housing;
    wherein the ninth rotation element is selectively connected to the fifth rotation element;
    wherein the twelfth rotation element is selectively connected to the first rotation element; and
    wherein the twelfth rotation element is selectively connected to the transmission housing.

2. The planetary gear train of claim 1, wherein
    the first rotation element, the second rotation element, and the third rotation element are respectively a sun gear, a planet carrier, and a ring gear of the first planetary gear set;
    the fourth rotation element, the fifth rotation element, and the sixth rotation element are respectively a sun gear, a planet earlier, and a ring gear of the second planetary gear set;
    the seventh rotation element, the eighth rotation element, and the ninth rotation element are respectively a sun gear, a planet carrier, and a ring gear of the third planetary gear set; and
    the tenth, rotation element, the eleventh rotation element, and the twelfth rotation element are respectively a sun gear, a planet carrier, and a ring gear of the fourth planetary gear set.

3. A planetary gear train of an automatic transmission for a vehicle, comprising:
    an input shaft configured for receiving an engine torque;
    an output shaft configured for outputting a shifted torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    six control elements for selectively interconnecting the rotation elements and a transmission housing;
    a first connecting member connected to the first rotation element;
    a second connecting member connected to the second rotation element and the eleventh rotation element, and directly connected to the output shaft;
    a third connecting member connected to the third rotation element and the seventh rotation element, and directly connected to the input shaft;
    a fourth connecting member connected to the fourth rotation element and directly connected to the transmission housing;
    a fifth connecting member connected to the fifth rotation element;
    a sixth connecting member connected to the sixth rotation element and the tenth rotation element;
    a seventh connecting member connected to the eighth rotation element, selectively connected to the third connecting member and the sixth connecting member, and selectively connected to the transmission housing;
    an eighth connecting member connected to the ninth rotation element and selectively connected to the fifth connecting member; and
    a ninth connecting member connected to the twelfth rotation element, selectively connected to the first connecting member, and selectively connected to the transmission housing.

4. The planetary gear train of claim 3, wherein
    the first planetary gear set is a single pinion planetary gear set, where the first rotation element is a first sun gear, the second rotation element is a first planet carrier, and the third rotation element is a first ring gear;
    the second planetary gear set is a single pinion planetary gear set, where the fourth rotation element is a second sun gear, the fifth rotation element is a second planet carrier, and the sixth rotation element is a second ring gear;
    the third planetary gear set is a single pinion planetary gear set, where the seventh rotation element is a third sun gear, the eighth rotation element is a third planet carrier, and the ninth rotation element is a third ring gear; and
    the fourth planetary gear set is a single pinion planetary gear set, where the tenth rotation element is a fourth sun gear, the eleventh rotation element is a fourth planet carrier, and the twelfth rotation element is a fourth ring gear.

5. The planetary gear train of claim 3, wherein the six control elements comprise:
    a first clutch selectively connecting the third connecting member and the seventh connecting member;
    a second clutch selectively connecting the sixth connecting member and the seventh connecting member;
    a third clutch selectively connecting the first connecting member and the ninth connecting member;

a fourth clutch selectively connecting the fifth connecting member and the eighth connecting member;

a first brake selectively connecting the seventh connecting member and the transmission housing; and a second brake selectively connecting the ninth connecting member and the transmission housing.

6. The planetary gear train of claim 5, wherein shift stages realized by selective operation of three control elements among the six control elements comprise:

a forward first speed formed by operation of the second and fourth clutches and the second brake;

a forward second speed formed by operation of the first clutch and second clutch and the second brake;

a forward third speed formed by operation of the first and fourth clutches and the second brake;

a forward fourth speed formed by operation of the first and third clutches and the second brake;

a thrward fifth speed formed by operation of the first, third, and fourth clutches;

a forward sixth speed formed by operation of the first, second, and third clutches;

a forward seventh speed formed by operation of the second, third, and fourth clutches;

a forward eighth speed formed by operation of the second and third clutches and the first brake;

a forward ninth speed formed by operation of the third and fourth clutches and the first brake; and a reverse speed formed by operation of the fourth clutch and the first and second brakes.

7. A planetary gear train of an automatic transmission for a vehicle, comprising:

an input shaft configured for receiving an engine torque;

an output shaft configured for outputting a shifted torque;

a first planetary gear set as a single pinion planetary gear set including a first rotation element, a second rotation element, and a third rotation element;

a second planetary gear set as a single pinion planetary gear set including a fourth rotation element, a fifth rotation element, and a sixth rotation element;

a third planetary gear set as a single pinion planetary gear set including a seventh rotation element, an eighth rotation element, and a ninth rotation element;

a fourth planetary gear set as a single pinion planetary gear set including a tenth rotation element, an eleventh rotation element, and a twelfth rotation element;

a first connecting member connected to the first rotation element;

a second connecting member connected to the second rotation element and the eleventh rotation element, and directly connected to the output shaft;

a third connecting member connected to the third rotation element and the seventh rotation element, and directly connected to the input shaft;

a fourth connecting member connected to the fourth rotation element and directly connected to the transmission housing;

a fifth connecting member connected to the fifth rotation element;

a sixth connecting member connected to the sixth rotation element and the tenth rotation element;

a seventh connecting member connected to the eighth rotation element, selectively connected to the third connecting member and the sixth connecting member, and selectively connected to the transmission housing;

an eighth connecting member connected to the ninth rotation element and selectively connected to the fifth connecting member;

a ninth connecting member connected to the twelfth rotation element, selectively connected to the first connecting member, and selectively connected to the transmission housing;

a first clutch selectively connecting the third connecting member and the seventh connecting member;

a second clutch selectively connecting the sixth connecting member and the seventh connecting member;

a third clutch selectively connecting the first connecting member and the ninth connecting member;

a fourth clutch selectively connecting the fifth connecting member and the eighth connecting member;

a first brake selectively connecting the seventh connecting member and the transmission housing; and a second brake selectively connecting the ninth connecting member and the transmission housing.

8. The planetary gear train of claim 7, wherein the first planetary gear set includes a first sun gear as the first rotation element, a first planet carrier as the second rotation element, and a first ring gear as the third rotation element;

the second planetary gear set includes a second sun gear as the fourth rotation element, a second planet carrier as the fifth rotation element, and a second ring gear as the sixth rotation element;

the third planetary gear set includes a third sun gear as the seventh rotation element, a third planet carrier as the eighth rotation element, and a third ring gear as the ninth rotation element; and the fourth planetary gear set includes a fourth sun gear as the tenth rotation element, a fourth planet carrier as the eleventh rotation element, and a fourth ring gear as the twelfth rotation element.

9. The planetary gear train of claim 7, wherein shift stages realized by operation of three control elements among the six control elements including the four clutches and the two brakes, comprise:

a forward first speed formed by operation of the second and fourth clutches and the second brake;

a forward second speed formed by operation of the first clutch and second clutch and the second brake;

a forward third speed formed by operation of the first and fourth clutches and the second brake:

a forward fourth speed formed by operation of the first and third clutches and the second brake;

a forward fifth speed formed by operation of the first, third, and fourth clutches;

a forward sixth speed formed by operation of the first, second, and third clutches;

a forward seventh speed formed by operation of the second, third, and fourth clutches;

a forward eighth speed formed by operation of the second and third clutches and the first brake;

a forward ninth speed formed by operation of the third and fourth clutches and the first brake; and a reverse speed formed by operation of the fourth clutch and the first and second brakes.

10. A planetary gear train of an automatic transmission for a vehicle, comprising:

an input shaft configured for receiving an engine torque;

an output shaft configured for outputting a shifted torque of the engine;

a first planetary gear set as a single pinion planetary gear set including a first sun gear, a first planet carrier, and a first ring gear;

a second planetary gear set as a single pinion planetary gear set including a second sun gear, a second planet carrier, and a second ring gear;

a third planetary gear set as a single pinion planetary gear set including a third sun gear, a third planet carrier, and a third ring gear;

a fourth planetary gear set as a single pinion planetary gear set including a fourth sun gear, a fourth planet carrier, and a fourth ring gear;

a first connecting member connected to the first sun gear;

a second connecting member connected to the first planet carrier and the fourth planet carrier, and directly connected to the output shaft;

a third connecting member connected to the first ring gear and the third sun gear, and directly connected to the input shaft;

a fourth connecting member connected to the second sun gear, and directly connected to the transmission housing;

a fifth connecting member connected to the second planet carrier;

a sixth connecting member connected to the second ring gear and the fourth sun gear;

a seventh connecting member connected to the third planet carrier, selectively connected to the third connecting member and the sixth connecting member, and selectively connected to the transmission housing;

an eighth connecting member connected to the third ring gear and selectively connected to the fifth connecting member;

a ninth connecting member connected to the fourth ring gear, selectively connected to the first connecting member, and selectively connected to the transmission housing; and six control elements selectively connecting the connecting members and the transmission housing.

11. The planetary gear train of claim 10, wherein the six control elements comprise:

a first clutch selectively connecting the third connecting member and the seventh connecting member;

a second clutch selectively connecting the sixth connecting member and the seventh connecting member;

a third clutch selectively connecting the first connecting member and the ninth connecting member;

a fourth clutch selectively connecting the fifth connecting member and the eighth connecting member;

a first brake selectively connecting the seventh connecting member and the transmission housing; and a second brake selectively connecting the ninth connecting member and the transmission housing.

12. The planetary gear train of claim 11, wherein shift stages realized by selective operation of three control elements among the six control elements comprise:

a forward first speed formed by operation of the second and fourth clutches and the second brake;

a forward second speed formed by operation of the first clutch and second clutch and the second brake;

a forward third speed formed by operation of the first and fourth clutches and the second brake;

a forward fourth speed formed by operation of the first and third clutches and the second brake;

a forward fifth speed formed by operation of the first, third, and fourth clutches;

a forward sixth speed formed by operation of the first, second, and third clutches;

a forward seventh speed formed by operation of the second, third, and fourth clutches;

a forward eighth speed formed by operation of the second and third clutches and the first brake;

a forward ninth speed formed by operation of the third and fourth clutches and the first brake; and a reverse speed formed by operation of the fourth clutch and the first and second brakes.

\* \* \* \* \*